Patented Nov. 7, 1933

1,934,015

UNITED STATES PATENT OFFICE 1,934,015

OPTICALLY ACTIVE 1-PHENYL-2-(N-METHYL-N-ARALKYL-)AMINOPROPA-PHENYL-2-(N-METHYL-)AMINOPROPA-NOLS-1 AND OPTICALLY ACTIVE 1-NOL-1 AND PROCESS OF PREPARING THEM

Friedrich Stolz and Franz Flaecher, Frankfort-on-the-Main-Hochst, Germany, assignors to Winthrop Chemical Company, Inc., New York, N. Y., a corporation of New York No Drawing. Application August 22, 1929, Serial No. 387,796, and in Germany September 3, 1928

7 Claims. (Cl. 260—128.5)

The present invention relates to optically active 1-phenyl-2-(N-methyl-N-aralkyl-)aminopropanols-1 and optically active 1-phenyl-2-(N-methyl-)aminopropanol-1 and a process of preparing them.

We have found that the synthetically prepared racemic 1-phenyl-2-(N-methyl-N-aralkyl-)aminopropanols-1 of the general formula:

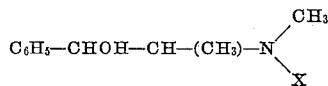

wherein X stands for a benzyl radical of the general formula $CH_2—C_6H_4—R$, wherein R stands for hydrogen or methyl can easily be resolved into their optically active components by transforming them into the bitartrates by means of levo- or dextro-tartaric acid, and that these optically active alkalines in the form of their salts or as free bases can be transformed into the optically active 1-phenyl-2-(N-methyl-)aminopropanols-1 by hydrogenating them the aralkyl group being then split off.

1-phenyl-2-(N-methyl-N-benzyl-)aminopropanol-1 can be prepared from methylbenzylaminopropiophenon by reduction by means of suitable reducing agents, such as for instance sodium and alcohol, or by causing benzyl chloride to react with 1-phenyl-2-(N-methyl-)aminopropanol-1. It forms colorless crystals, which melt at 72° C.–73° C. It is sparingly soluble in water and readily soluble in most organic solvents.

When racemic 1-phenyl-2-(N-methyl-N-benzyl-)aminopropanol-1 is resolved by means of dextro-tartaric acid, the dextro-tartrate of dextro-1-phenyl-2-(N-methyl-N-benzyl-)aminopropanol-1 first crystallizes out almost completely, whilst the dextro-tartrate of levo-1-phenyl-2-(N-methyl-N-benzyl-)aminopropanol-1 remains in solution. The base obtained when the latter compound has been decomposed easily crystallizes. It is levo-rotary and, on catalytic hydrogenation, it yields besides toluene levo-1-phenyl-2-(N-methyl-)aminopropanol-1 which is identical with the natural ephedrin. In this manner we easily succeed in obtaining the therapeutically important levo-1-phenyl-2-(N-methyl-)-aminopropanol-1 in a good yield without using the expensive levo-tartaric acid.

The base obtained from the crystallized dextro-tartrate of dextro-1-phenyl-2-(N-methyl-N-benzyl)aminopropanol-1 likewise crystallizes well; it is dextro-rotary and is resolved by catalytic hydrogenation into dextro-1-phenyl-2-(N-methyl-)aminopropanol-1 and toluene.

The following example serves to illustrate our invention, but it is not intended to limit it thereto.

500 g of racemic 1-phenyl-2-(N-methyl-N-benzyl-)aminopropanol-1 (melting at 72° C.–73° C.) are mixed with a solution of 295 g of dextro-tartaric acid in 2 kg of water, whereupon there is produced a precipitate which redissolves on heating and on further addition of water. After the solution has been allowed to stand for some hours, the dextro-tartrate of dextro-1-phenyl-2-(N-methyl-N-benzyl-)aminopropanol-1, which has crystallized, is separated, after being recrystallized once or twice from water it melts at 101° C.–102° C. From the combined mother liquors a further quantity of the dextro-tartrate of dextro-1-phenyl-2-(N-methyl-N-benzyl-)aminopropanol-1 crystallizes on standing and is separated by filtration.

In the filtrate there is dissolved the dextro-tartrate of levo-1-phenyl-2-(N-methyl-N-benzyl-)aminopropanol-1. The base which is obtained from the salt on decomposition by means of an alkali melts after being recrystallized from petroleum ether, at a temperature of 49° C.–50° C. and has a specific rotation of $[\alpha]_D = -7.25°$. The levo-1-phenyl-2-(N-methyl-N-benzyl-)aminopropanol-1 is catalytically hydrogenated either as hydrochloride in an aqueous solution or as a free base in an alcoholic solution. Levo-1-phenyl-2-(N-methyl-)aminopropanol-1 is thus obtained besides toluene. It can be purified by conversion into its oxalate or hydrochloride. The hydrochloride melts at 215° C.–216° C. and has a specific rotation $[\alpha]_D = -35°$. The base obtained from the hydrochloride by precipitation melts at 39° C.–40° C.

In an analogous manner there can be obtained from the dextro-tartrate of dextro-1-phenyl-2-(N-methyl-N-benzyl-)aminopropanol-1 by treatment with an alkali and catalytic hydrogenation in the usual manner of the free base so obtained the dextro-1-phenyl-2-(N-methyl-)aminopropanol-1 melting at 39° C.–40° C.

Instead of water there may also be used alcohol as solvent.

The 1-phenyl-2-(N-methyl-N-benzyl-)aminopropanol-1 may also be resolved in an analogous manner by means of levo-tartaric acid; in this case the sparingly soluble levo-tartrate of levo-1-phenyl-2-(N-methyl-N-benzyl-)1-aminopropanol-1 first crystallizes out and the levo-tartrate of dextro-1-phenyl-2-(N-methyl-N-benzyl-)aminopropanol-1 remains dissolved in the mother liquor. The products are worked up in the manner indicated in the example.

Instead of the benzyl radical there may also stand such substitution products, in which the hydrogen atoms of the benzene nucleus are substituted by alkyl, such as for instance the xylyl radical or the like.

We claim:

1. The process which comprises reacting upon racemic 1-phenyl-2-(N-methyl-N-aralkyl-) aminopropanol-1 of the following general formula

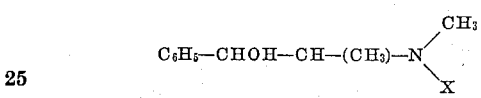

wherein X represents a benzyl radical of the general formula $CH_2-C_6H_4-R$, wherein R stands for hydrogen or methyl with optically active tartaric acid and separating the precipitate thus obtained by fractional crystallization from the solution and subsequently replacing X by hydrogen by catalytic hydrogenation of the optically active propanol compounds thus obtained in the form of their salts or as free bases.

2. The process which comprises reacting upon racemic 1-phenyl-2-(N-methyl-N-aralkyl-) aminopropanol-1 of the following general formula

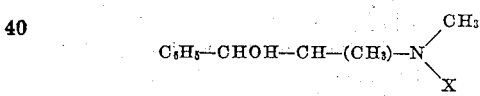

wherein X represents a benzyl radical of the general formula $CH_2-C_6H_4-R$, wherein R stands for hydrogen or methyl in an aqueous solution with optically active tartaric acid and separating the precipitate thus obtained by fractional crystallization from the solution and subsequently replacing X by hydrogen by catalytic hydrogenation of the optically active propanol compounds thus obtained in the form of their salts or their free bases.

3. The process which comprises reacting upon racemic 1-phenyl-2-(N-methyl-N-aralkyl-) aminopropanol-1 of the following formula

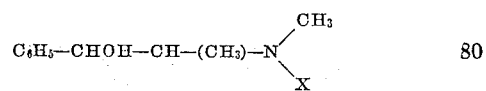

wherein X represents a benzyl radical of the general formula $CH_2-C_6H_4-R$, wherein R stands for hydrogen or methyl in an aqueous solution with dextro-tartaric acid and separating the solid dextro-tartrate of dextro-1-phenyl-2-(N-methyl-N-aralkyl-)aminopropanol-1 from the solution containing the dextro-tartrate of levo-1-phenyl-2-(N-methyl-N-aralkyl-)aminopropanol-1 thus obtained by fractional crystallization and subsequently replacing X by hydrogen by catalytic hydrogenation of the optically active propanol compounds thus obtained in the form of their salts or as free bases.

4. The process which comprises reacting upon racemic 1-phenyl-2-(N-methyl-N-benzyl-)aminopropanol-1 with dextro-tartaric acid in an aqueous solution and separating the solid dextro-tartrate of dextro-1-phenyl-2-(N-methyl-N-benzyl-)aminopropanol-1 from the solution containing the dextro tartrate of levo-1-phenyl-2-(N-methyl-N-benzyl-)aminopropanol-1 thus obtained by fractional crystallization and subsequently replacing the benzyl group by hydrogen by catalytic hydrogenation of the optically active 1-phenyl-2-(N-methyl-N-benzyl-)propanol-1 thus obtained in the form of their salts or as free bases.

5. As new products the optically active compounds of the following general formula

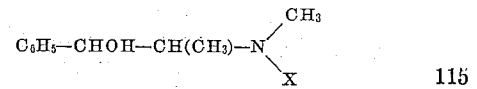

wherein X represents a benzyl radical of the general formula $CH_2-C_6H_4-R$, wherein R stands for hydrogen or methyl being well crystallized.

6. As a new product the levo 1-phenyl-2-(N-methyl-N-benzyl-) aminopropanol-1 forming crystals of the melting point of 49°–50° C. and having a specific rotation of $[\alpha]_D = -7.25°$.

7. As a new product the dextro-1-phenyl-2-(N-methyl-N-benzyl-)aminopropanol-1 forming crystals of the melting point 49°–50° C. and having a specific rotation of $[\alpha]_D = +7.25°$.

FRIEDRICH STOLZ.
FRANZ FLAECHER.

CERTIFICATE OF CORRECTION.

Patent No. 1,934,015. November 7, 1933.

FRIEDRICH STOLZ, ET AL.

It is hereby certified that error appears in the above numbered patent requiring correction as follows: In the heading to the printed specification, lines 2 to 7 inclusive, strike out the title of invention, as printed, and insert instead the following: Optically active 1-phenyl-2-(N-methyl-N-aralkyl-)aminopropanols-1 and optically active 1-phenyl-2-(N-methyl-)aminopropanol-1 and process of preparing them; and that the said Letters Patent should be read with this correction therein that the same may conform to the record of the case in the Patent Office.

Signed and sealed this 11th day of May, A. D. 1937.

Henry Van Arsdale
Acting Commissioner of Patents.

(Seal)